United States Patent
Chalana et al.

(10) Patent No.: US 10,148,525 B1
(45) Date of Patent: Dec. 4, 2018

(54) METHODS AND SYSTEMS FOR MITIGATING RISK IN DEPLOYING UNVETTED DATA HANDLING RULES

(71) Applicant: Winshuttle, LLC, Bothell, WA (US)

(72) Inventors: Vikram Chalana, Bothell, WA (US); Deep Dhillon, Seattle, WA (US)

(73) Assignee: WINSHUTTLE, LLC, Bothell, WA (US)

( * ) Notice: Subject to any disclaimer, the term of this patent is extended or adjusted under 35 U.S.C. 154(b) by 0 days.

(21) Appl. No.: 15/953,223

(22) Filed: Apr. 13, 2018

(51) Int. Cl.
| | |
|---|---|
| *G06F 21/62* | (2013.01) |
| *H04L 12/24* | (2006.01) |
| *G06N 99/00* | (2010.01) |
| *H04L 12/58* | (2006.01) |
| *H04L 29/06* | (2006.01) |
| *G06N 5/04* | (2006.01) |

(52) U.S. Cl.
CPC ............. *H04L 41/22* (2013.01); *G06N 5/046* (2013.01); *G06N 99/005* (2013.01); *H04L 41/12* (2013.01); *H04L 51/04* (2013.01); *H04L 67/42* (2013.01)

(58) Field of Classification Search
CPC ......... H04L 41/22; H04L 41/12; H04L 51/04; H04L 67/42; G06N 5/046; G06N 99/005
See application file for complete search history.

(56) References Cited

U.S. PATENT DOCUMENTS

| | | | |
|---|---|---|---|
| 7,350,141 B2 | 3/2008 | Kotler et al. |
| 7,519,589 B2 | 4/2009 | Charnock et al. |
| 7,603,294 B2 | 10/2009 | Singh et al. |
| 8,328,610 B2 | 12/2012 | Shimura et al. |
| 8,463,658 B2 | 6/2013 | Racco |
| 8,538,965 B1 | 9/2013 | Talyansky et al. |
| 8,543,490 B2 | 9/2013 | Lerner |
| 8,689,096 B2 | 4/2014 | Bross et al. |
| 8,719,299 B2 | 5/2014 | Voigt et al. |
| 8,788,443 B2 | 7/2014 | Hoffmann |
| 8,843,845 B2 | 9/2014 | Ouyang et al. |
| 8,949,136 B2 | 2/2015 | Heyman |
| 8,996,555 B2 | 3/2015 | Kuchmann-Beauger et al. |
| 9,021,380 B2 | 4/2015 | Zhai et al. |
| 9,025,834 B2 | 5/2015 | Hang et al. |
| 9,053,474 B2 | 6/2015 | White |
| 9,063,710 B2 | 6/2015 | Bornhoevd et al. |
| 9,069,844 B2 | 6/2015 | Roy et al. |
| 9,087,091 B2 | 7/2015 | Raiber et al. |
| 9,098,803 B1 | 8/2015 | Todd et al. |

(Continued)

OTHER PUBLICATIONS

Nathan Moeller; Creating a Classifier for a Focused Web Crawler; Dec. 16, 2015; Intelligent Agents class; University of Minnesota.

(Continued)

*Primary Examiner* — Anil K Bhargava
(74) *Attorney, Agent, or Firm* — AEON Law, PLLC; Adam L. K. Philipp; Jonathan E. Olson

(57) ABSTRACT

Methods and systems are presented for monitoring data entry from one or more client devices, obtaining a predicted value for a particular field using one or more data handling rules, logging significant user input from at least one of the client devices superseding the predicted value, and automatically responding by generating a message that presents an option to deactivate one or more of the data handling rules.

19 Claims, 10 Drawing Sheets

(56) References Cited

U.S. PATENT DOCUMENTS

| | | | |
|---|---|---|---|
| 9,119,056 B2 | 8/2015 | Hourani et al. | |
| 9,152,627 B2 * | 10/2015 | Kung | G06F 17/30 |
| 9,165,049 B2 | 10/2015 | Kieselbach et al. | |
| 9,177,289 B2 | 11/2015 | Roy et al. | |
| 9,183,058 B2 | 11/2015 | Li et al. | |
| 9,189,566 B2 | 11/2015 | Roy et al. | |
| 9,213,771 B2 | 12/2015 | Chen et al. | |
| 9,256,412 B2 | 2/2016 | Genevski et al. | |
| 9,348,811 B2 | 5/2016 | Hartl et al. | |
| 9,355,020 B2 | 5/2016 | Schur et al. | |
| 9,361,273 B2 | 6/2016 | Dannecker et al. | |
| 9,436,906 B2 | 9/2016 | Wang | |
| 9,443,214 B2 | 9/2016 | Shami | |
| 9,449,281 B2 | 9/2016 | Basel et al. | |
| 9,454,571 B2 | 9/2016 | Grosse et al. | |
| 9,454,677 B1 | 9/2016 | Sinclair et al. | |
| 9,501,567 B2 | 11/2016 | Lemcke et al. | |
| 9,529,919 B2 | 12/2016 | Zhang et al. | |
| 9,535,960 B2 | 1/2017 | Guo et al. | |
| 9,535,975 B2 | 1/2017 | Bornhoevd et al. | |
| 9,552,549 B1 | 1/2017 | Gong et al. | |
| 9,558,352 B1 * | 1/2017 | Dennison | G06F 21/552 |
| 9,569,413 B2 | 2/2017 | Shami et al. | |
| 9,569,700 B1 | 2/2017 | Santos et al. | |
| 9,576,383 B2 | 2/2017 | Bous | |
| 9,582,608 B2 | 2/2017 | Bellegarda et al. | |
| 9,601,109 B2 | 3/2017 | Horesh et al. | |
| 9,606,530 B2 | 3/2017 | Aqlan et al. | |
| 9,639,818 B2 | 5/2017 | Shami | |
| 9,652,148 B2 | 5/2017 | Min | |
| 9,652,740 B2 | 5/2017 | Janarthanam et al. | |
| 9,652,743 B2 | 5/2017 | Zhu et al. | |
| 9,659,248 B1 | 5/2017 | Barbosa et al. | |
| 9,659,600 B2 | 5/2017 | Wang et al. | |
| 9,667,740 B2 | 5/2017 | Pasumarthi et al. | |
| 9,671,237 B1 | 5/2017 | Ellassi et al. | |
| 9,721,002 B2 | 8/2017 | Pfeifer et al. | |
| 9,740,754 B2 | 8/2017 | Roy et al. | |
| 9,760,628 B2 * | 9/2017 | Smit | G06F 17/276 |
| 9,767,409 B1 | 9/2017 | Makhijani et al. | |
| 9,767,410 B1 | 9/2017 | Guevara et al. | |
| 9,779,174 B2 | 10/2017 | Sheik Adam et al. | |
| 9,787,540 B2 | 10/2017 | Landscheidt et al. | |
| 9,798,393 B2 | 10/2017 | Neels et al. | |
| 9,800,689 B2 | 10/2017 | Said et al. | |
| 2008/0071708 A1 * | 3/2008 | Dara | G06K 9/6218 706/20 |
| 2011/0193795 A1 | 8/2011 | Seidman et al. | |
| 2014/0040741 A1 | 2/2014 | Os et al. | |
| 2014/0066189 A1 | 3/2014 | Brooks et al. | |
| 2014/0229912 A1 | 8/2014 | Furtado et al. | |
| 2015/0112770 A1 | 4/2015 | Phillips | |
| 2015/0262098 A1 | 9/2015 | Kinsey | |
| 2016/0357724 A1 | 12/2016 | Stein et al. | |
| 2017/0083527 A1 | 3/2017 | Kumar et al. | |
| 2017/0161753 A1 | 6/2017 | McKinnon et al. | |
| 2017/0178030 A1 | 6/2017 | Pal | |
| 2017/0185670 A1 | 6/2017 | Dua et al. | |
| 2017/0193093 A1 | 7/2017 | Byron et al. | |
| 2017/0351951 A1 * | 12/2017 | Santos | G06F 17/30598 |
| 2018/0188824 A1 * | 7/2018 | Dunne | G06F 3/0237 |

OTHER PUBLICATIONS

Random forest interpretation—conditional feature contributions; Oct. 24, 2016; Diving into data: A blog on machine learning, data mining and visualization; URL: http://blog.datadive.net/random-forest-interpretation-conditional-feature-contributions/.

Jason Brownlee; An introduction to Feature Selection; Oct. 6, 2014; Machine Learning Process; URL: https://machinelearningmastery.com/an-introduction-to-feature-selection/.

Computational Methods of Feature Selection (Chapman & Hall/CRC Data Mining and Knowledge Discovery Series); URL: https://www.amazon.com/dp/1584888784?tag=inspiredalgor-20.

Feature Selection; Wikipedia; URL: http://en.wikipedia.org/wiki/Feature_selection.

* cited by examiner

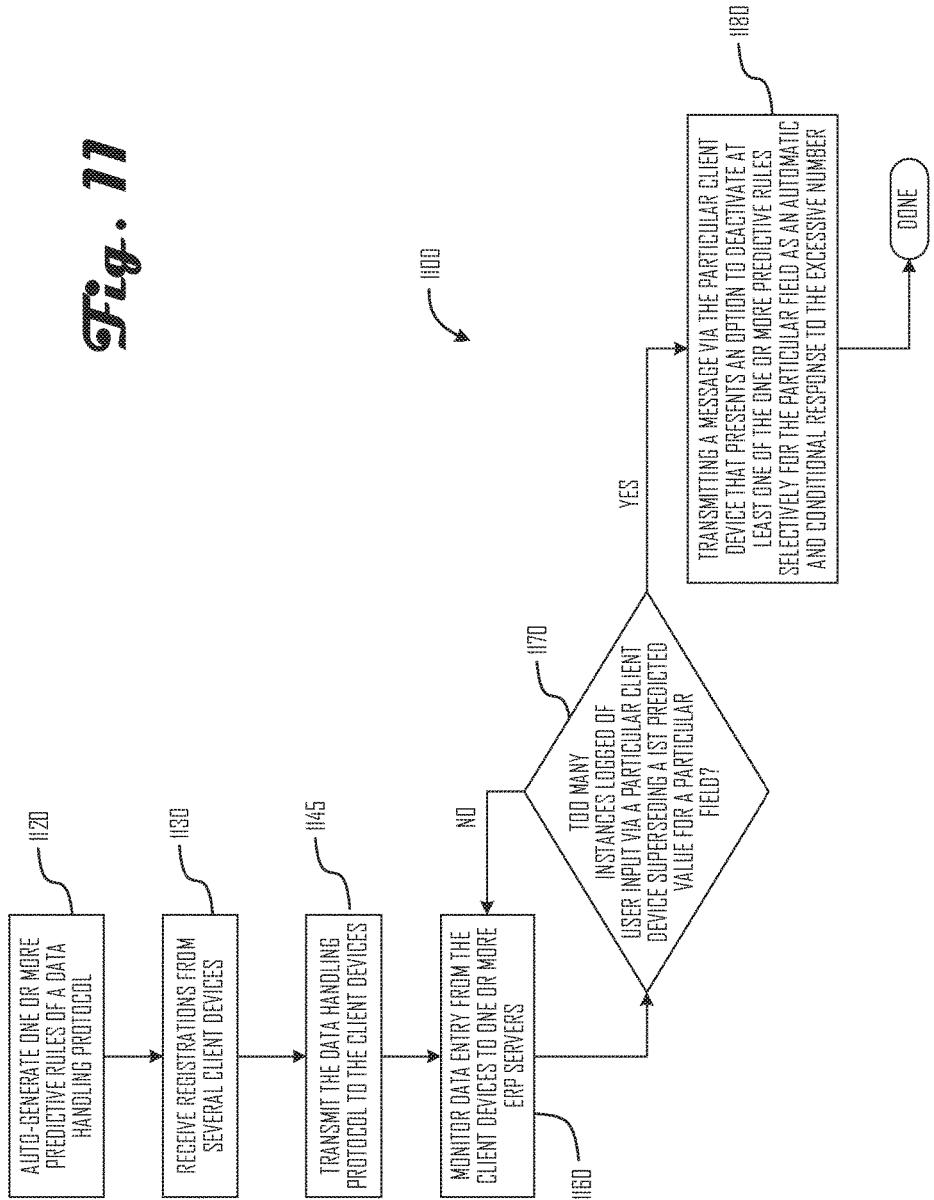

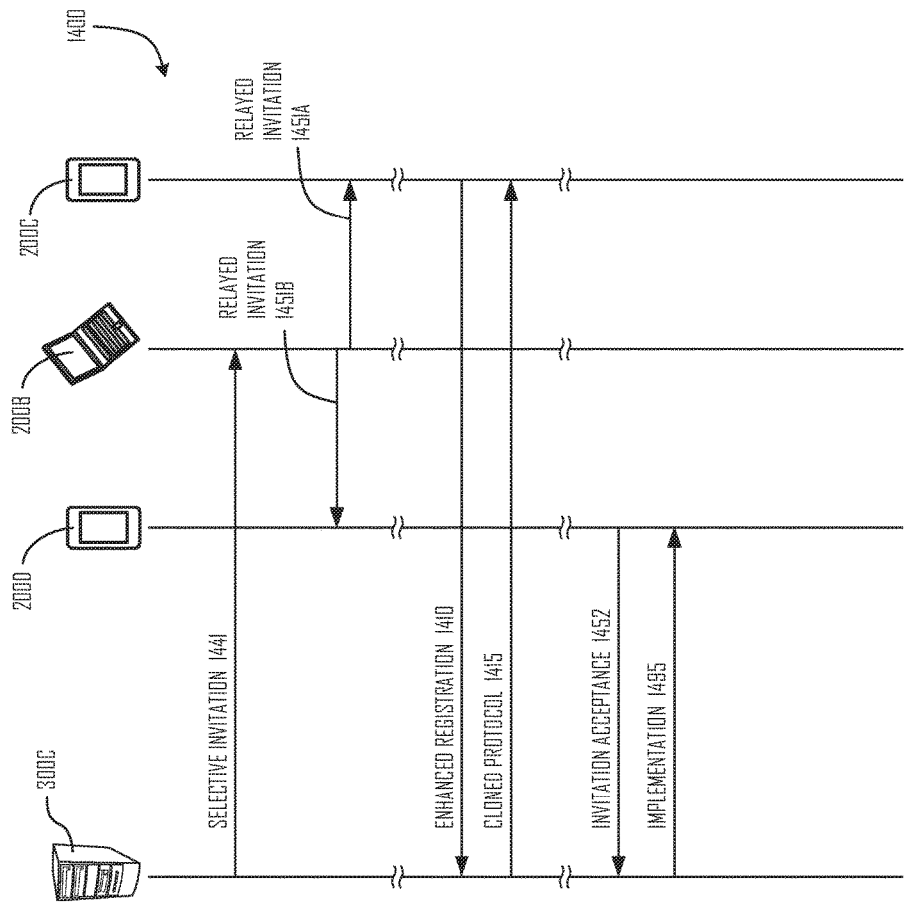
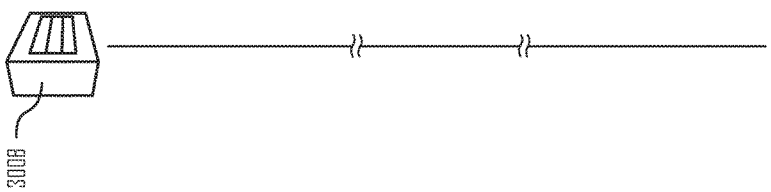
Fig. 14

METHODS AND SYSTEMS FOR MITIGATING RISK IN DEPLOYING UNVETTED DATA HANDLING RULES

FIELD

This disclosure relates to streamlining deployment of data handling rules that may not have been fully vetted.

BRIEF DESCRIPTION OF THE DRAWINGS

FIG. 11 illustrates a flow of a device-executable routine in accordance with some embodiments.

FIG. 14 illustrates another particular scenario and progressive data flow in which one or more client devices and servers interact in accordance with some embodiments.

DETAILED DESCRIPTION

Figure 1:
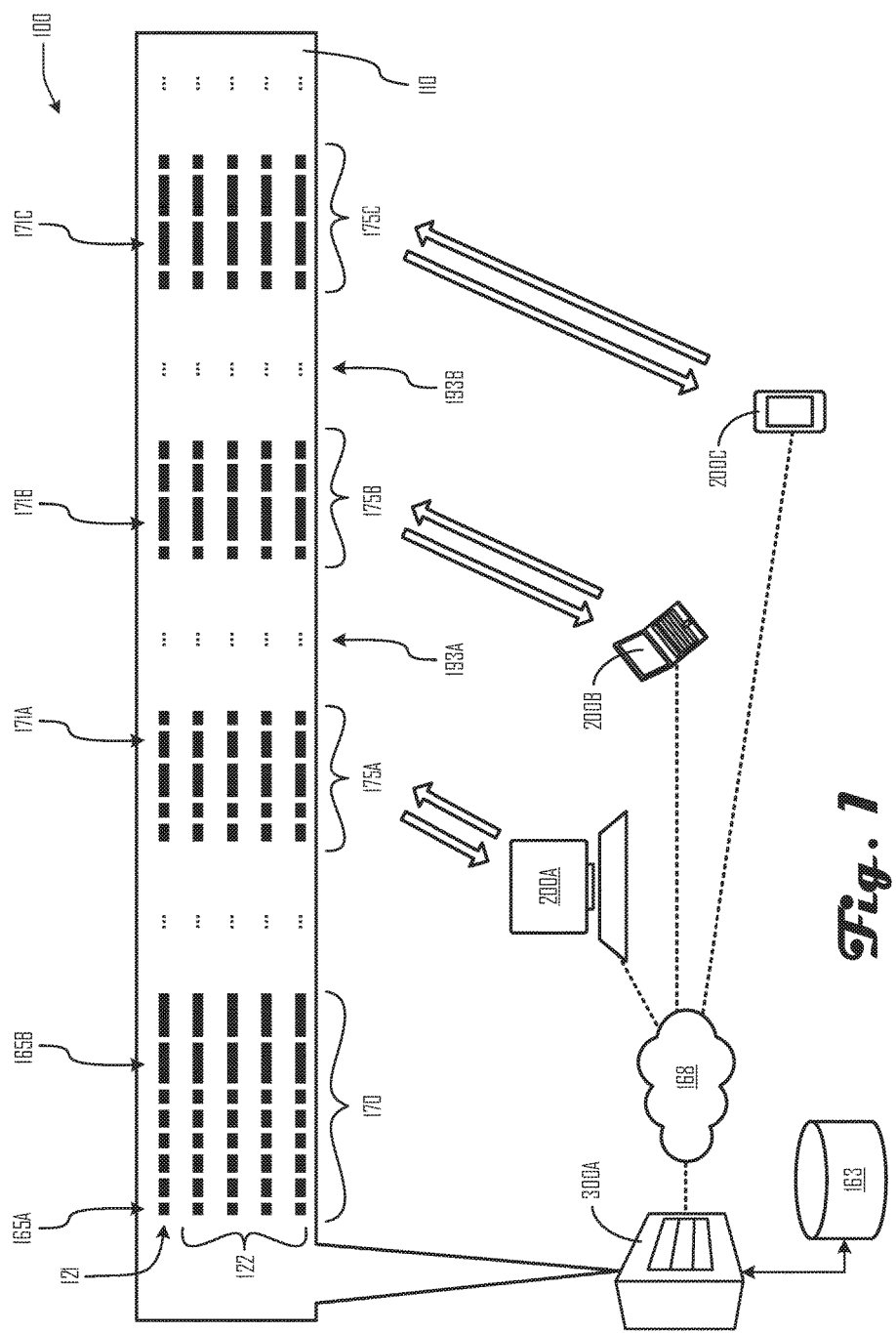
FIG. 1 illustrates an exemplary network topology of an information management system in accordance with various embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Accepted," "additional," "automatic," "broadcast," "by," "conditional," "configured," "deactivated," "exceptional," "first," "from," "generated," "invoked," "joint," "least," "logged," "modified," "more," "numerous," "of," "predicted," "predictive," "presented," "proposed," "remote," "residing," "resequenced," "second," "selectively," "sequential," "simultaneous," "single," "superseded," "to," "transmitted," "wherein," or other such descriptors herein are used in their normal yes-or-no sense, not merely as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. As used herein, the term "contemporaneous" refers to circumstances or events that are concurrent or at least roughly contemporaneous (on the same day, e.g.).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary network topology of an information management system 100 in accordance with various embodiments as further described below. A central information management server 300 (see FIG. 3) is in data communication with a plurality of client devices 200A-C (see FIG. 2) via one or more networks 168. In various embodiments, network 168 may include the Internet, one or more local area networks ("LANs"), one or more wide area networks ("WANs"), cellular data networks, and/or other data networks. Network 168 may, at various points, be a wired and/or wireless network. Remote information management server 300 may be in data communication with one or more information management data stores 163.

In various embodiments, any of client devices 200A-C may be networked computing devices having form factors including general purpose computers (including "desktop," "laptop," "notebook," "tablet" computers, or the like); mobile phones; watches, glasses, or other wearable computing devices. In the example shown in FIG. 1, client device 200A is depicted as a laptop/notebook computer, client device 200B is depicted as a handheld device, and client device 200C is depicted as a computer workstation. In various embodiments there may be fewer or many more respondent devices than are shown in FIG. 1.

As is described in more detail below, in various embodiments, remote information management server 300 may be a networked computing device generally capable of accepting requests over network 168 e.g. from any one of respondent devices 200A-C and/or other networked computing devices (not shown), and providing responses accordingly. The functional components of an exemplary information management server 300 that remotely supports advanced interactions with various client devices 200A-C are described below in reference to FIG. 3.

As shown, server 300A maintains (in memory 304, e.g.) one or more centrally maintained data tables 110 that may contain at least one record 121 co-owned among human entities depicted as users associated with respective devices 200A-C, at least some of whom own respective dedicated zones 175A-C of the record. If a particular human user "A" is directly editing a field 171A within her zone 175A of record 121 via a browser of her device 200A, for example, another human user "B" may simultaneously edit one or more fields 171B within his zone 175B of record 121 via a browser of his device 200B.

As shown, each record 121 of table 110 includes one or more inter-zone partitions 193A, 193B signifying different types/degrees of ownership/access. One such partition 193A, for example, signifies that an owner of a zone 175A (user "A" or her department, e.g.) on one side of the partition is able to see and modify her zone but not that of the zone 175B on the other side. Another such partition 193B, for example, signifies that an owner of a zone 175B (user "B" or his department, e.g.) on one side of the partition is able to see and modify his zone but is only able to see (and not modify) any field 171C of the zone 175C on the other side of that partition. In respective variants, either such type of partition 193A, 193B may be one-sided or reciprocal.

As shown, the record 121 being edited (and other records 122 of the table) has a plurality of shared fields 165A-B, including a "key" field 165A that uniquely identifies the record and one or more other fields 165B that provide reference information as exemplified below. The fields in zone 170 are "shared" insofar that all are viewable to co-owners of that record. In some variants, as described below, a privileged user (using device 200C, e.g.) may have authority to review the content of the entire record 121 (in response to data validation errors shown, e.g.). Alternatively or additionally, such a privileged user may also have authority to correct and/or finalize the content of the entire record 121 (respectively in response to data validation errors shown or lack thereof, e.g.).

Figure 2:
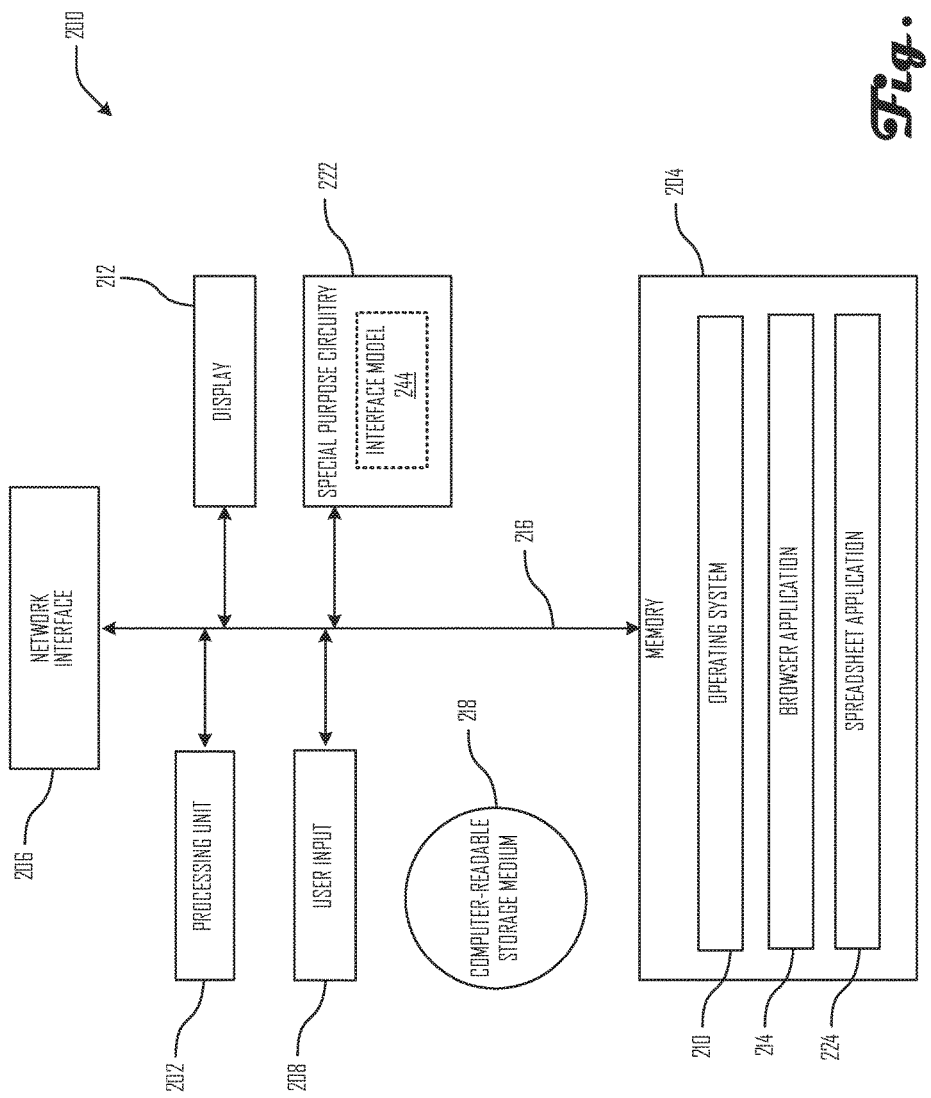
FIG. 2 illustrates a client device in which one or more technologies may be implemented.

FIG. 2 illustrates a client device 200 in which one or more technologies may be implemented. In respective embodiments, client device 200 may be a general-purpose computer or may include special-purpose components not shown. As shown in FIG. 2, exemplary client device 200 includes one or more processing units 202 in data communication with one or more memories 204 via one or more buses 216. Each such memory 204 generally comprises some or all of random access memory (RAM), read-only memory (ROM), and/or a permanent mass storage device, such as a disk drive, flash memory, or the like. Client device 200 may also include one or more instances of network interfaces 206, of user inputs 208, of displays 212, or of speakers (not shown).

As shown, memory 204 of exemplary client device 200 may store an operating system 210, as well as program code for a number of software applications, such as a client web browser application 214. Client web browser application 214 is a software application by which, under server control, client devices can present data to users and transmit data entered by them. These and other software components, as well as various data files (not shown) may be loaded into memory 204 via network interface (optional) 206 (or via a selectively removable computer readable storage medium 218, such as a memory card or the like).

In operation, operating system 210 manages the hardware and software resources of the client device 200 and provides common services for various software applications, such as client web browser application 214. For hardware functions such as network communications via network interface 206, obtaining data via user input 208, rendering data via display 212 and/or speaker, and allocation of memory 204 to various resources, operating system 210 may act as an intermediary between software executing on client device 200 and the client device's hardware.

For example, operating system 210 may cause a representation of locally available software applications, such as client web browser application 214 or spreadsheet application 224, to be rendered locally (via display 212, e.g.). If operating system 210 obtains, e.g. via user input 208, a selection of client web browser application 214, operating system 210 may instantiate a client web browser application process (not shown), i.e. cause processing unit 202 to begin executing the executable instructions of client web browser application 214 and allocate a portion of memory 204 for its use. In some variants, one or more local text editors (in the case of CSV-formatted spreadsheet files, e.g.) or spreadsheet applications (Microsoft Excel, e.g.) may be configured to allow offline editing of a downloaded spreadsheet (as described below, e.g.). Alternatively or additionally, such editing may occur "offline" in the sense that a client device is temporarily disconnected from one or more servers 300.

Although an exemplary client device 200 has been described, a client device 200 may be any of a great number of computing devices capable executing program code, such as the program code corresponding to client web browser application 214 or spreadsheet application. Alternatively or additionally, some such client devices 200 may include special-purpose circuitry 222 as described herein (implementing a local interface model 244 as described below, e.g.).

Figure 3:
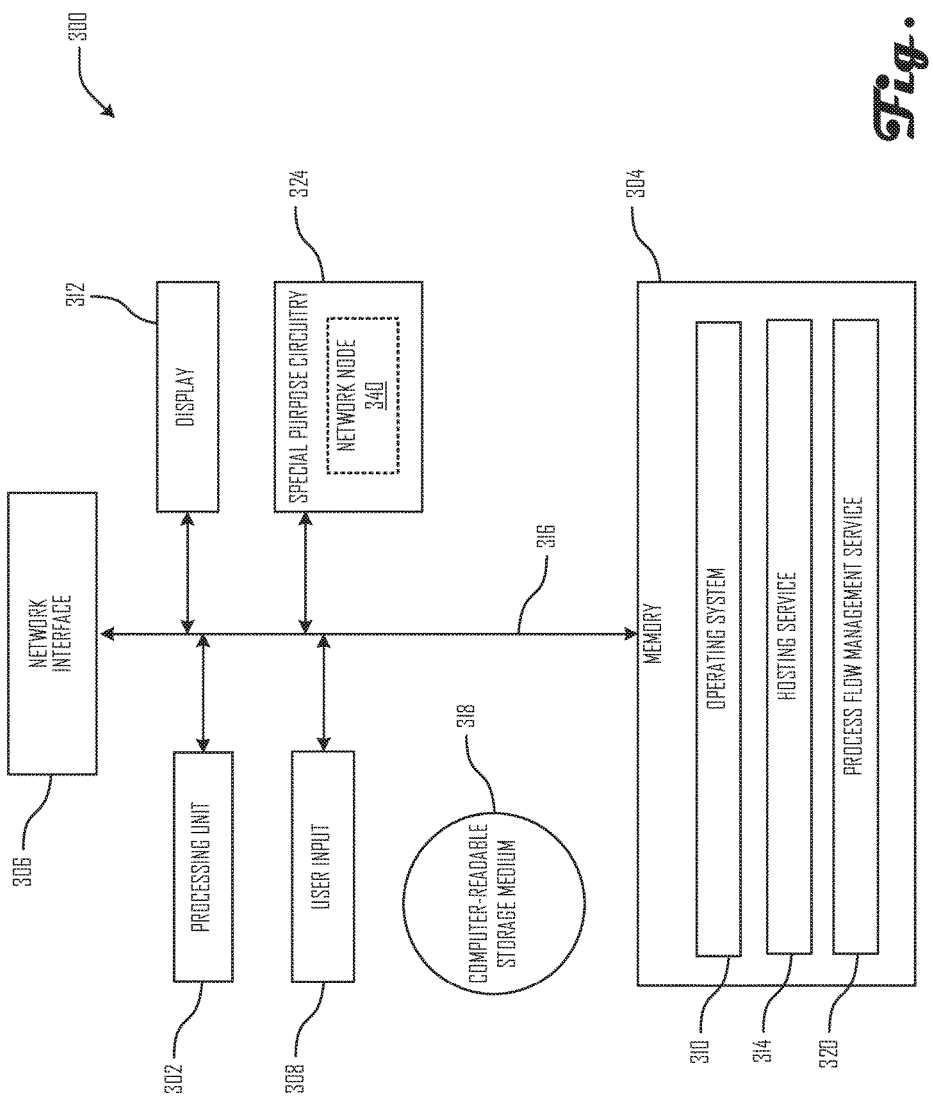
FIG. 3 illustrates a server in which one or more technologies may be implemented.

FIG. 3 illustrates a server 300 in which one or more technologies may be implemented. As shown in FIG. 3, exemplary server 300 includes one or more processing units 302 in data communication with one or more memories 304 via one or more buses 316. Each such memory 304 generally comprises some or all of random access memory (RAM), read-only memory (ROM), and/or a permanent mass storage device, such as a disk drive, flash memory, or the like. Server 300 may also include one or more instances of network interfaces 306, of user inputs 308, of displays 312, or of speakers (not shown).

As shown, memory 304 of exemplary server 300 may store an operating system 310, as well as program code for a number of software applications, such as a hosting service 314. Hosting service 314 is a software application by which, under server control, client devices 200 can present data to users and transmit data from users. Process flow management service 320 is a software application by which one or more processes, such as those described with reference to FIGS. 11-14, are coordinated. These and other software components, as well as various data files (not shown) may be loaded into memory 304 via network interface 306 (or via a selectively removable computer readable storage medium 318, such as a memory card or the like).

In operation, operating system 310 manages the hardware and software resources of the server 300 and provides common services for various software applications, such as hosting service 314. For hardware functions such as network communications via network interface 306, obtaining data via user input 308, rendering data via display 312 and/or speaker 316, allocation of memory 304 to various resources, and invoking one or modules of special-purpose circuitry 400, operating system 310 may act as an intermediary between software executing on server 300 and the server's hardware. In some variants, moreover, user account records are maintained in server 300, designating which user accounts are associated with which zones 175 and what privileges each such user account has with regard to other zones, as described herein. Alternatively, in some variants, user account records 324 may reside in memory 304 or in special-purpose circuitry 324.

For example, operating system 310 may cause a representation of locally available software applications, such as hosting service 314 or spreadsheet application 322, to be rendered locally (via display 312, e.g.). If operating system 310 obtains, e.g. via user input 308, a selection of hosting service 314, operating system 310 may instantiate a hosting service 314 process (not shown), i.e. cause processing unit 302 to begin executing the executable instructions of hosting service 314 and allocate a portion of memory 304 for its use. In some variants, one or more local text editors (in the case of comma-separated-value spreadsheet files, e.g.) or spreadsheet applications (Microsoft® Excel, e.g.) may be configured to allow offline editing of a downloaded spreadsheet (as described below, e.g.). Alternatively or additionally, such editing may occur "offline" in the sense that the server is temporarily disconnected from server 300.

Although an exemplary server 300 has been described, a server 300 may be any of a great number of computing devices capable executing program code, such as the program code corresponding to a hosting service 314 or Enterprise Resource Planning (ERP) application. Alternatively or additionally, the structures described with reference to FIG. 3 may likewise be implemented by a special-purpose peer computer in a peer-to-peer network or may include special-purpose circuitry 322 as described herein (implementing a neural network node 340 as described below, e.g.).

Figure 4:
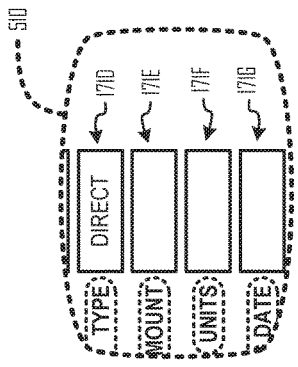
FIG. 4 illustrates depicts a display screen image of a form such as may be shown on a display of a client device.

FIG. 4 depicts a display screen image 410 of (a portion of) a form such as may be shown on a display 212 of a client device. A sequence of labels 417A-D respectively identify content 419 (values, e.g.) that have been entered by a user into the form. A portion of the form (field 171D, e.g.) is in the progress of editing, as shown by a popup menu there offering a user a plurality of acceptable options (comprising "INDIRECT" and "DIRECT").

Figure 5:
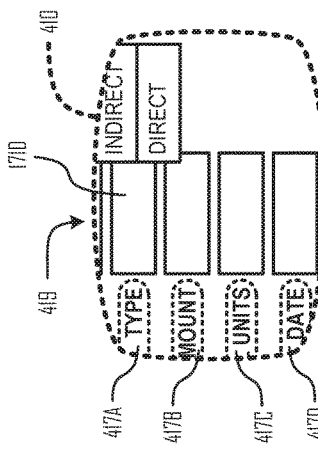
FIG. 5 illustrates the form of FIG. 4 in a more advanced state.

FIG. 5 depicts a display screen image 510 of the form in a more advanced state. "DIRECT" has been selected for the field 171D labeled as "TYPE." The other displayed fields 171E-G are still empty.

Figure 6:
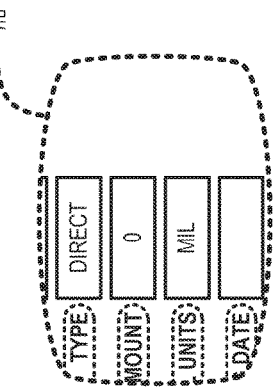
FIG. 6 illustrates the form of FIG. 5 in a more advanced state.

FIG. 6 depicts a display screen image 610 of the form in a more advanced state. Field 171E is no longer empty but has been given a value of zero. This need not reflect a value directly entered by the user entering the data, though. In a context in which "DIRECT" has been identified as predictive of a zero value at field 171E, for example, that value could have been assigned as an autocompletion response (passing a cursor directly down from field 171D to field 171F in the same stroke, e.g.). Likewise it could have been assigned as an autocorrection response (as a predictive adjustment to a user having tried to enter an implausible value of "_0" into field 171F, e.g.).

Figure 7:
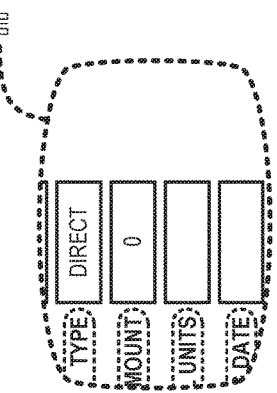
FIG. 7 illustrates the form of FIG. 6 in another state.

FIG. 7 depicts a display screen image 710 of the form in another state. Field 171F is no longer empty but has been given a value of "MIL." This need not reflect a value directly entered by the user entering the data as illustrated above, though. Moreover machine learning technology may reveal protocols as a result of these values and others entered later that some user actions are indicative of a data validation opportunity. Users who select and stick by units of "MIL" might be discovered rarely to enter an "AMOUNT" of zero, for example. Or in some variants such a pattern may emerge as valid in one data entry context (in an industry identified as "DELIVERED GOODS" for example) and not in others.

Figure 8:
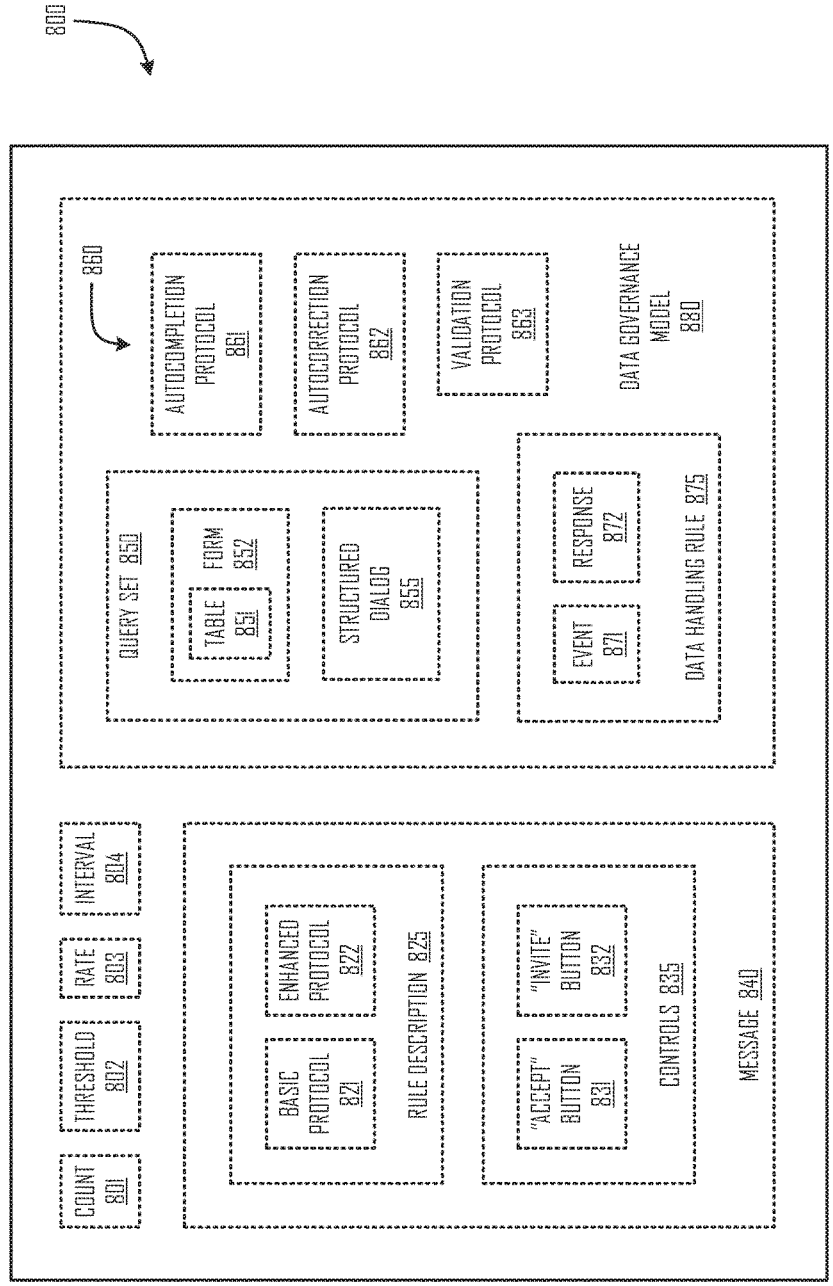
FIG. 8 illustrates data storage media in which various data entities may reside.

FIG. 8 depicts non-transitory data storage media 800 (in memory 304, e.g.) in which one or more (digitally manifested instances of) counts 801, thresholds 802, rates 803, intervals 804, or messages 840 may reside. In some variants such counts may comprise an exception count, for example, pertaining to an individual, a cohort, or an entire community of clients and to a particular time interval or classification. In some variants such messages 840 may comprise one or more (digitally manifested instances of) rule descriptions 825 (differentiating a basic protocol 821 from an enhanced protocol 822, e.g.) or user-invokable controls 835 (an "accept" button 831, an "invite" button, a hyperlink, or a menu option presented in message 840, e.g.) as described below. Moreover each such message 840 may likewise correspond to one or more features (fields 171, e.g.) of a sequenced query set 850 (manifested in a table 851 or other form 852 or a structured dialog 855 by which data may be elicited from a user, e.g.) that makes up a data governance model 880 by which data entry is performed (at a client device 200 assigned to a specific user, e.g.). In general each data governance model 880 will include one or more data handling protocols 860 each having multiple data handling rules 875, a modification of which can make data entry by users much more efficient and accurate. A "data handling protocol," as used herein, refers to one or more instances of autocompletion protocols 861, autocorrection protocols 862, validation protocols 863, or protocol combinations that include at least one of these and that implement at least one data handling rule 875. A "data handling rule," as used herein, refers to one or more events 871 associated with one or more programmatic responses 872 thereto in regard to data entry by or otherwise attributed to one or more human users. In some variants, the media 800 pertaining to a data governance model 880 in effect for a given client, cohort, or population may be distributed (so that some are part of a local interface model 244, e.g.).

Figure 9:
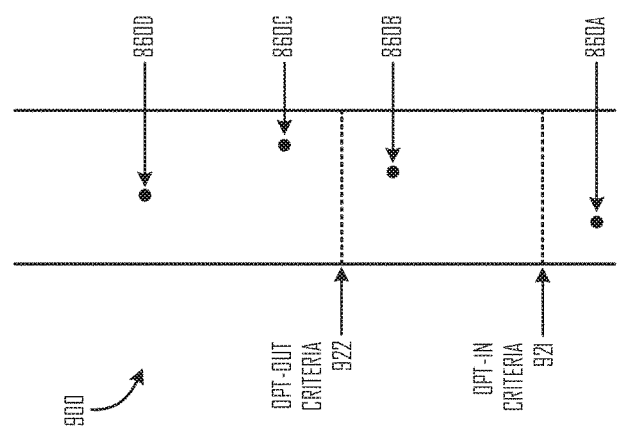
FIG. 9 depicts a schema by which unvetted predictive rules may be differentiated from highly established predictive rules and from tentative predictive rules undergoing evaluation.

FIG. 9 depicts a schema 900 by which unvetted predictive rules (implemented in data handling protocol 860A, e.g.) may be differentiated from highly established predictive rules (implemented in data handling protocol 860D, e.g.) and from tentative predictive rules (implemented in data handling protocols 860B-C, e.g.) undergoing evaluation (in coordination with a cohort of users, e.g.). A curator or similar expert may selectively designate a data handling protocol 860B as being available for some users to "opt into" (by distributing messages 840 of invitation as described below, e.g.). So long as one or more opt-in thresholds 802 or other opt-in criteria 921 are met, (client devices 200 of) additional users may join the cohort that performs the evaluation. In some variants, a data handling protocol 860C may become more established (so that some new users will join by default and have the option of opting out, e.g.). One or more opt-out thresholds 802 or other opt-out criteria 922 may be defined, moreover, so that a popular opt-in data handling protocol 860B may automatically achieve "opt-out" status or so that an unpopular opt-out data handling protocol 860C may automatically be demoted to "opt-in" status as further described below.

Figure 10:
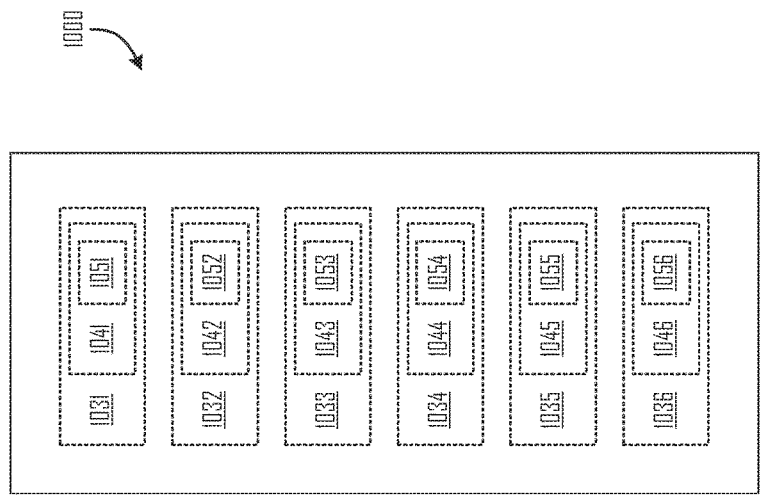
FIG. 10 illustrates special-purpose transistor-based circuitry in which some or all of the functional modules described below may be implemented.

FIG. 10 illustrates special-purpose transistor-based circuitry 1000—optionally implemented as an Application-Specific Integrated Circuit (ASIC) or in a UI governance server, e.g.—in which some or all of the functional modules described below may be implemented. Transistor-based circuitry 1000 is an event-sequencing structure generally as described in U.S. Pat. Pub. No. 20150094046 but configured as described herein. Transistor-based circuitry 1000 includes one or more instances of rule generation modules 1031, for example, each including an electrical node set 1041 upon which informational data is represented digitally as a corresponding voltage configuration 1051.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Transistor-based circuitry 1000 likewise includes one or more instances of client registration modules 1032 each including an electrical node set 1042 upon which informational data is represented digitally as a corresponding voltage configuration 1052. Transistor-based circuitry 1000 likewise includes one or more instances of protocol configuration modules 1033 each including an electrical node set 1043 upon which informational data is represented digitally as a corresponding voltage configuration 1053. Transistor-based circuitry 1000 likewise includes one or more instances of logging modules 1034 each including an electrical node set 1044 upon which informational data is represented digitally as a corresponding voltage configuration 1054. Transistor-based circuitry 1000 likewise includes one or more instances of detection modules 1035 each including an electrical node set 1045 upon which informational data is represented digitally as a corresponding voltage configuration 1055. Transistor-based circuitry 1000 likewise includes one or more instances of communication modules 1036 each including an electrical node set 1046 upon which informational data is represented digitally as a corresponding voltage configuration 1056. In some variants, as described below in the clauses and claims, such a module implements such functionality jointly (in conjunction with other modules or processing units 302 described herein, e.g.). Alternatively or additionally, in some variants such modules (or components thereof) may be distributed (so that some are implemented in special-purpose circuitry 324 of respective servers 300, e.g.).

FIG. 1100 illustrates an operational flow 1100 (implemented in software as a routine executed or coordinated by one or more instances of processing unit 302, e.g.) suitable for use with at least one embodiment, such as may be performed (in some variants) on a server 300 using special-purpose circuitry 324 via a process flow management service 320. As will be recognized by those having ordinary skill in the art, not all events of information management are illustrated in FIG. 11. Rather, for clarity, only those steps reasonably relevant to describing the tabular data modification aspects of flow 1100 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1120 depicts auto-generating one or more predictive rules of a data handling protocol (a rule generation module 1031 generating, in an automated process, an expression of a programmatic response 872 in association with one or more specific events 871, e.g.). This can occur, for example, in a context in which the one or more specific events 871 include a user selecting "DIRECT" as a value for field 171D; in which the programmatic response 872 comprises a processing unit 202, 302 entering "0" as a value for field 171E; in which that data handling rule 875 is a component of an autocompletion protocol 861 or an autocorrection protocol 862 (or both); and in which the data handling rule 875 is expressed as a voltage configuration 1051 on an electrical node set 1041 of the rule generation module 1031. In some variants, for example, a collection of neural network nodes 340 may perform operation 1120 by generating dozens or hundreds of data handling rules 875 using live data entry (see FIG. 12-14, e.g.) by numerous clients as training data. In some variants a human curator may select a few such data handling rules 875 each for use with crowd workers or other error-tolerant client cohorts as a low risk mode of vetting auto-generated rules (to determine which of the rules are effective enough to predict what data a user will enter by learning data indicative of a user manually overriding the response 872, e.g.).

Operation 1130 depicts receiving registrations from several client devices (a client registration module 1032 receiving user information or other credentials from several client devices 200A-C so that each can be distinguished in future interactions, e.g.). This can occur, for example, in a context in which one or more such client devices will have privileges (access to particular fields 171 or processes, e.g.) not universally shared; in which each such device can be associated with a corresponding set of operating parameters (specifying features of a data handling protocol 860 or user preferences, e.g.) that can be changed and remembered across login sessions; in which messages 840 can be remembered and retrieved (like email messages, e.g.) even if they have not been read or used; and in which a device or client identifier is expressed as a voltage configuration 1052 on an electrical node set 1042 of the client registration module 1032.

Operation 1145 depicts transmitting the data handling protocol to the client devices (a protocol configuration module 1033 transmitting one or more sequenced query sets 850, forms 852, or other features of a default data handling protocol 860 are in effect to whichever client devices 200 signed up during operation 1130, e.g.). This can occur, for example, in a context in which protocol configuration module 1033 maintains one default data handling protocol 860 for each client classifier (industry identifier, e.g.) and in which client registration module 1032 is configured to request a client classifier during the client registration so as to facilitate an initial data handling protocol that is effectively adapted to the intended purpose of the client device registration.

Operation 1160 depicts monitoring data entry from the client devices to one or more enterprise resource planning servers (a logging module 1034 monitoring one or more clients entering content 419 into fields 171 or other preconfigured storage elements via user inputs 208 of their respective devices 200 directly or indirectly into one or more enterprise resource planning servers 300A, e.g.). This can occur, for example, in a context in which logging module 1034 tracks which data handling protocol 860 is in effect during such data entry as well as which fields 171 had predicted values (provided to users according to a version of autocompletion protocol 861 or an autocorrection protocol 862 then in effect at the user input 208, e.g.) that were apparently overwritten by the device users (by virtue of a final data entry result differing from the predicted response 872 of that version, e.g.).

Operation 1170 depicts detecting an indication of too many instances of user input via a particular client device superseding a first predicted value for a particular field (a detection module 1035 detecting an indication of too many instances of user input via a particular client device superseding a first predicted value for a particular field, e.g.). This can occur, for example, in a context in which detection module 1035 maintains a count 801 of how many times the first predicted value for the particular field is superseded as well as a threshold 802 signifying how many instances are "too many"; in which threshold 802 is expressed as a voltage configuration 1055 on an electrical node set 1045 of the detection module 1035; in which detecting "not too many" instances results in looping back to operation 1160 as shown; and in which detecting "too many" instances results in proceeding forward to operation 1180 as shown.

Operation 1180 depicts transmitting a message via the particular client device that presents an option to deactivate at least one of the one or more predictive rules selectively for the particular field as an automatic and conditional response to the excessive number (a communication module 1036 transmitting a message 840 via the particular client device 200 that presents the user with a user-actionable control to deactivate at least one of the data handling rule 875 selectively for the particular field as an automatic and conditional response to detecting the indication of "too many instances" at operation 1170, e.g.). This can occur, for example, in a context in which a human curator receives a copy of each of the outgoing messages 840 (as a "cc" by email to ensure message clarity and maintain ongoing refinements, e.g.); in which the "user-actionable control" is a hyperlink, button, or similar single-step response by which the user of the particular client device 200 can authorize the modification described by the message 840; and in which communication module 1036 maintains a destination identifier (as an email address of a user or Internet Protocol address of the particular client device, e.g.) as a voltage configuration 1056 on an electrical node set 1046 of the communication module 1036. In some contexts, for example, the message 840 may propose a conditional deactivation of an autocompletion protocol 861 or autocorrection protocol 862 (or both).

In some variants, for example, methods of this type may be performed by (1) by a logging module 1034 recording a first instance of user input from the particular client device 200 to the one or more ERP servers 300B superseding the first predicted value for the particular field using the first data handling protocol 860; (2) by the logging module 1034 later recording one or more additional instances of user input from the particular client device 200 superseding the first predicted value; (3) by a detection module 1035 detecting one or more opt-in criteria 921 or opt-out criteria 922 signaling a predictive rule repeatedly being unsuccessful; and (4) by communication module 1036 automatically and conditionally responding by initiating a message 840 that presents a user-invokable option to deactivate the predictive rule selectively. This can occur, for example, in a context in which no one having enough skill to modify the rule is available and in which even easy-to-detect criteria (an exception count 801, rate 802, or similar determinant crossing a threshold 802, e.g.) signaling predictive failure would not otherwise be actionable.

In some variants such a message 840 may signal a suggestion to resequence a sequenced query set 850. This can streamline data entry in response to rule generation module 1031 discovering that one or more later-encountered fields 171F, 171G are more effectively predictive of an earlier-encountered field 171E than content 419 presently used as a predictive determinant, for example. Alternatively or additionally, a rate 803 of such instances (counting how many happen in a month or how many days happen between successive occurrences, e.g.) crossing a threshold 802 may likewise constitute an appropriate and readily detected "indication of too many" instances of user input via a particular client device superseding a first predicted value for a particular field (too often superseding a predicted "AMOUNT" of zero in field 171E with a nonzero value entered manually, e.g.).

Figure 12:
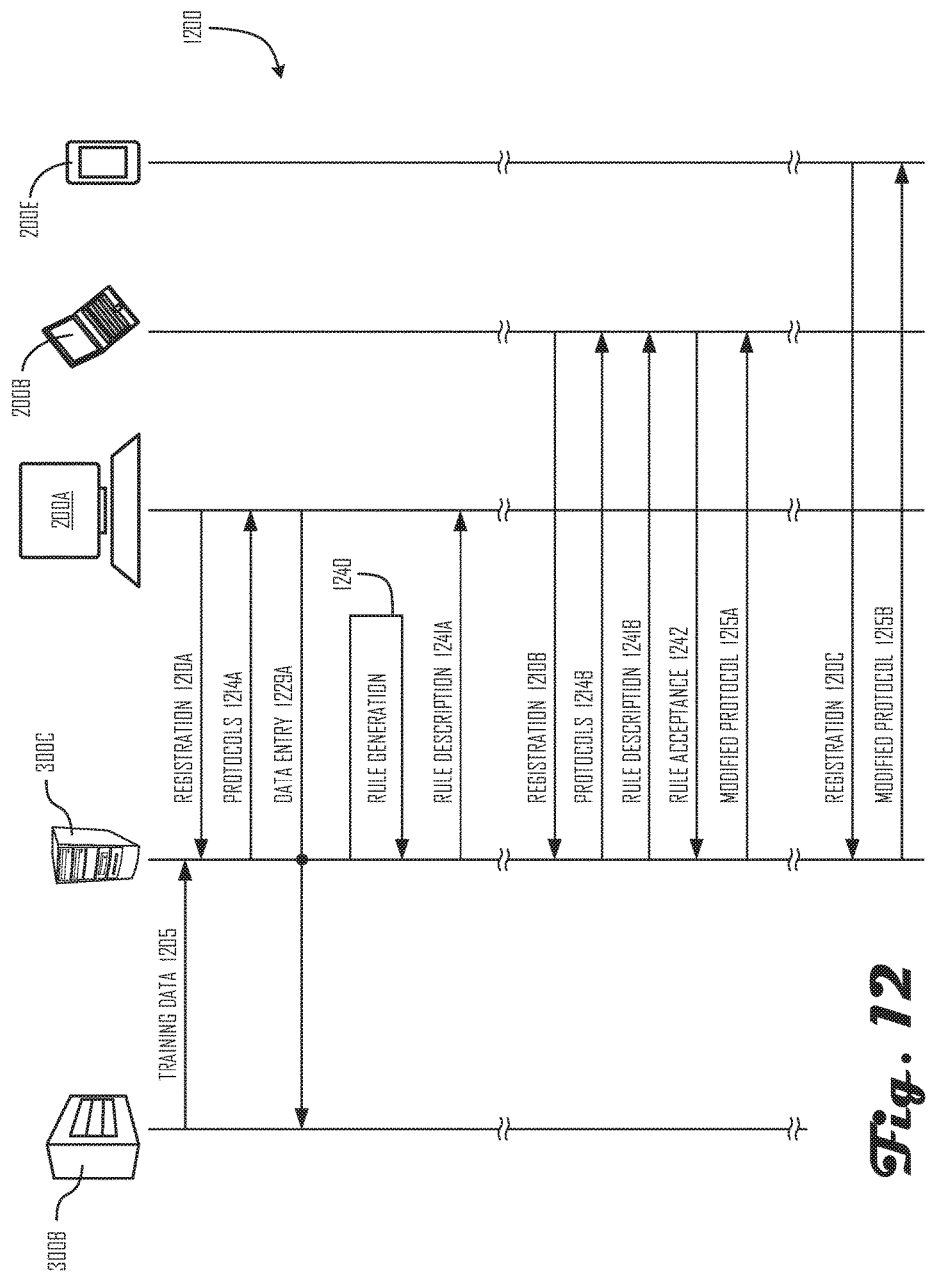
FIG. 12 illustrates a particular scenario and progressive data flow in which one or more client devices and servers interact in accordance with some embodiments.

FIG. 12 depicts a particular scenario and progressive data flow 1200 in which one or more client devices 200 and servers 300 (operably coupled via remote linkages or via the Internet as shown in FIG. 1, e.g.) interact. As shown such servers 300 include one or more enterprise resource planning (ERP) servers 300B and one or more User Interface (UI) governance servers 300C, either of which may comprise more than one server or function as described herein. As shown, training data 1205 is received at the one or more UI governance servers 300C (from the one or more ERP servers 300B, e.g.) signaling comparable information from client devices like that of client device 200A, if available. Upon registration 1210A of client device 200A, (digital expressions of) best available initial protocols 1214A are downloaded as shown (by an instance of protocol configuration module 1033 in a UI governance server 300C, e.g.). Using such initial protocols 1214A, data entry 1229A from client device 200A (to the one or more ERP servers 300B, e.g.) proceeds and is monitored at the one or more UI governance servers 300C.

Based on such data entry 1229 and other training data 1205, rule generation 1240 may then proceed. Such rule generation 1240 may result in a new data handling rule 875 suitable for use as an autocompletion rule (a machine-generated instance of an autocompletion response 872 associated with an event 871 apparently suitable in an autocompletion protocol 861, e.g.). Likewise such a new data handling rule 875 may be suitable for use as an autocorrection rule (a machine-generated instance of an autocorrection response 872 associated with an event 871 apparently suitable in an autocorrection protocol 862, e g) Likewise such a new data handling rule 875 may be suitable for use as data validation rule (a machine-generated instance of data validation response 872 associated with an event 871 apparently suitable in a data validation protocol 862, e.g.). Before such a new data handling rule 875 is implemented for client device 200A, however, a message 840 describing what the new rule would do is automatically generated. For a rule change that would add complexity, the message 840 may include a rule description 825 illustrating how a basic protocol 821 currently in effect may differ from an enhanced protocol 822 that implements the new data handling rule 875. Alternatively or additionally, the message 840 may include user-actionable controls 835 such as an "accept" button 831 that allows the rule change at the client device 200A to proceed. As shown, the rule description 1241A embodied in such a message 840 is transmitted to client device 200A and retained for possible future acceptance (in an email message list or similar message inventory, e.g.).

Upon registration 1210B of client device 200B, best available initial protocols 1214B are again downloaded as shown. Using such initial protocols 1214B, data entry 1229 from client device 200B (to the one or more ERP servers 300B, e.g.) may then proceed and be monitored at the one or more UI governance servers 300C. As an automatic and conditional response to such registration 1210B, a rule description 1241B (substantially identical to rule description 1241A, e.g.) is also sent to client device 200B. In this way a less-established unvetted rule (as a component of data handling protocol 860B, e.g.) may be adopted quickly and easily by at least some users who like its rule description 1241B without any significant imposition upon those who do not. In response to a rule acceptance 1242 sent by a client device 200B that has received a rule description 1241B (containing a hyperlink or similar accept-type control in the message 840 containing the rule description 1241B, e.g.), the one or more UI governance servers 300C downloads a modified protocol 1215A that incorporates the data handling rule 875 accepted.

In some contexts special purpose circuitry (a protocol configuration module 1033, e.g.) may implement one or more opt-in criteria 921 such that if not enough client devices (below a preset percentage, e.g.) send a rule acceptance 1242 for a given rule description 1241 (defined by a curator, e.g.), an "opt-in" data handling protocol 860B may become a manual protocol (like protocol 860A, e.g.). In some variants a curator may take this as a signal that something is amiss in the rule description 1241 or in the predictive value of the data handling rule 875 to which it pertains. In the former case an enhancement to the rule description 1241 may be made and the data handling protocol 860 may be restored to "opt-in" status.

In some contexts special purpose circuitry (a protocol configuration module 1033, e.g.) may likewise implement one or more opt-out criteria 921 such that if enough client devices (above a preset percentage, e.g.) send a rule acceptance 1242 for a given rule description 1241 (defined by a curator, e.g.), an "opt-in" data handling protocol 860B may achieve "opt-out" status (like protocol 860C, e.g.).

Upon registration 1210C of another new client device 200E, a modified protocol 1215B that incorporates all such "opt-out" data handling protocols 860 is provided automatically in the further-enhanced modified protocol 1215B. To implement an opt-out feature in relation to data handling protocol 860B, for example, a message 840 quite opposite to rule description 1241B may be sent, optionally including an invitation to remove or otherwise deactivate rule(s) of data handling protocol 860B.

Alternatively or additionally, in some contexts such data handling rules 875 may manifest a modified data entry protocol 1215 that includes a resequenced query set (wherein each query thereof is manifested as a field 171 in a form 852 or similar information element in a structured dialog 855, e.g.) to one or more client devices 200 as an automatic and conditional response partly based on receiving a rule acceptance 1242 (manifested as an acceptance code that identifies the first rule description 1241, e.g.) selectively corresponding to a first rule description 1241 and partly based on the first rule description 1241 having at least one element not present in the one or more first data entry protocols 1214B. This can occur, for example, in a context in which the one or more UI governance servers 300C would otherwise implement an unsuitable data handling protocol 860A (incorporating implausible predictions or other unwanted features, e.g.) across all newly-registered client devices 200.

Figure 13:
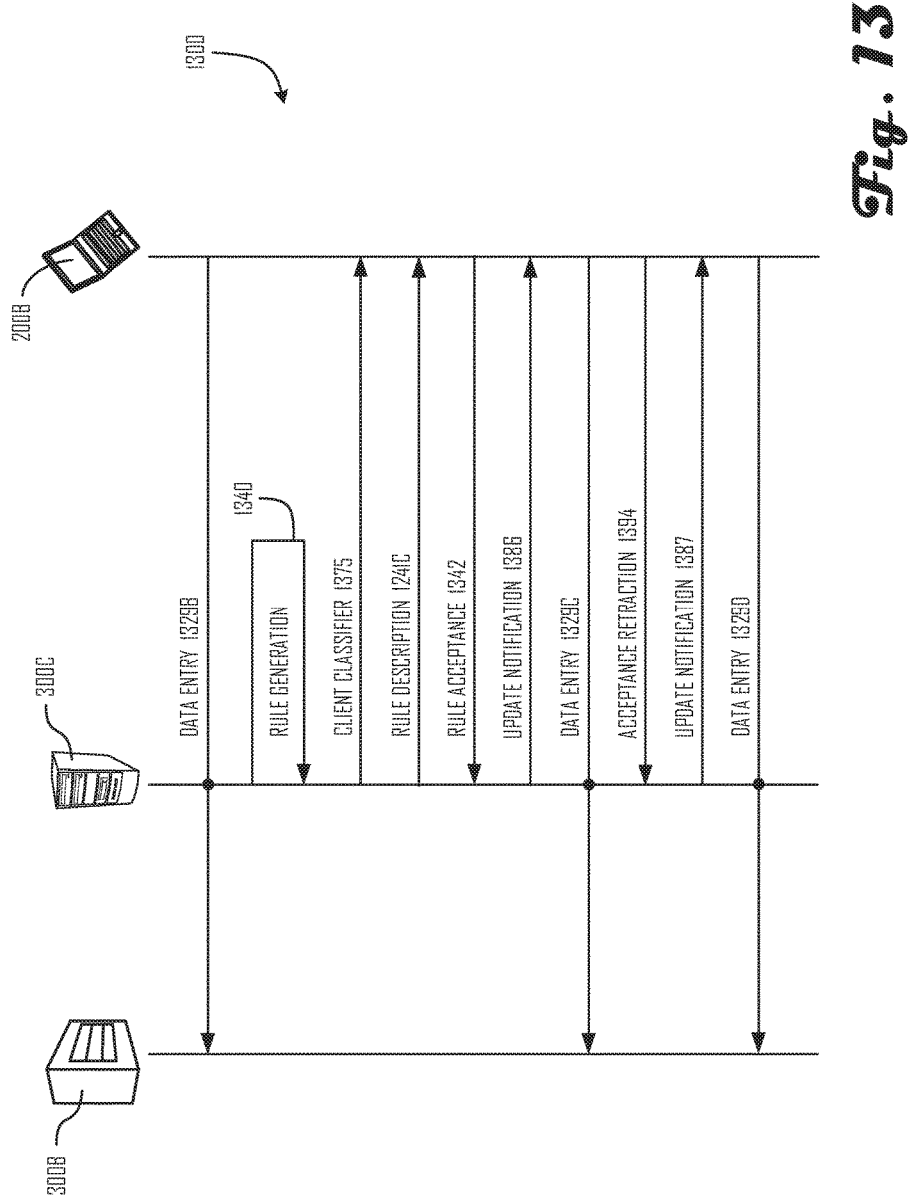
FIG. 13 illustrates another particular scenario and progressive data flow in which one or more client devices and servers interact in accordance with some embodiments.

FIG. 13 likewise depicts a particular scenario and progressive data flow 1300 optionally implemented as an interleaved variant of FIG. 12. In response to data entry 1329B from client device 200B to the one or more ERP servers 300B monitored at the one or more UI governance servers 300C, processing upon that data entry gives rise to additional rule generation 1340. In some contexts, this allows special-purpose circuitry (some variants of detection module 1035, e.g.) to infer a client classifier 1375 (an industry identifier, e.g.) by which client device 200B may be likened to a specific subset of client devices 200 (that gave rise to training data 1205, e.g.). In some contexts a client classifier 1375 may likewise be obtained or confirmed as user input (during a registration 1210B, e.g.) via client device 200B. In some contexts such a client classifier 1375 may be used as a basis for selecting the data handling protocol 860 (among many each associated with a corresponding client classifier 1375, e.g.) by which client device 200B (at the one or more UI governance servers 300C, e.g.) will initially function during such data entry 1329B (prior to modified protocol 1215A or other such refinements described herein, e.g.).

In a context in which a data governance model allows industry-specific or other client-class-specific data handling 875 rules, the discovery or acceptance of an appropriate client classifier 1375 may permit an identification of one or more data handling rules 875 particular to that class of client. For an opt-in data handling protocol 860B that includes one or more client-class-specific data handling 875 rules, for example, this may trigger an immediate instance of rule description 1241C arriving at client device 200B. If the user of client device 200B signals a corresponding rule acceptance 1342, (some variants of) protocol configuration module 1033 may then implement the newly-attributed data handling rule(s) 875 and provide an appropriate update notification 1386 as a rule change notification message 840 (containing an opt-out-type control 835 for each discrete data handling rule 875 therein, e.g.) which is then preserved (in an email message list, e.g.). This can occur, for example, in a context in which validation of manually entered data would otherwise result in an unacceptable industry-specific development cycle, error rate, and necessity of user guessing.

If after viewing that update notification 1386 as a rule change notification message 840 the user of client device 200B does not like any of the new rules, that user can then find that message 840 and activate the acceptance retraction 1394. This rule change likewise triggers an appropriate update notification 1387 as a rule change notification message 840 describing how subsequent data entry 1329D at client device 200B will be conducted.

FIG. 14 likewise depicts a particular scenario and progressive data flow 1400 optionally implemented as an interleaved variant of FIG. 12. In response to a selective invitation 1441 (including a rule description 1241, e.g.) at client device 200B, in some variants this also allows one or more types of relayed invitations 1451A-B to be sent (by activating an "invite" button 832 or invite-type control 835 in a message 840 thereof, e.g.). If such a relayed invitation 1451A is sent to a recipient that wants to accept an entire data handling protocol 860 (client device 200C, e.g.), this may allow the relayed invitation recipient to accept by transmitting an enhanced registration 1410 and thereby receive an entire cloned protocol 1415, one that duplicates the data handling protocol 860 (including all forms 852 and structured dialogs 855 in effect at the relaying client device 200B. This can occur, for example, in a context in which he exact protocol that an established user (of client device 200B, e.g.) has implemented incrementally, such as by a succession of selective instances of invitation acceptances, would otherwise be difficult to reproduce on a newly-configured client device 200C.

If such a relayed invitation 1451B is sent to a recipient that wants to accept only some of the data handling protocol 860 in effect at the relaying client device 200B however, then the invitation acceptance 1452 will trigger that selective implementation 1495 as shown (optionally implemented as a structured dialog requesting an identification of the data handling protocol parts to be implemented. In either case, the relayed invitation recipient may optionally receive a confirmatory message 840 that invites the recipient to reverse the update. This can occur, for example, in a context in which data governance rules would otherwise be unable to react to changes in business process and data content.

In light of teachings herein, numerous existing techniques may be applied for configuring special-purpose circuitry or other structures effective for managing records or for configuring other decisions and devices as described herein without undue experimentation. See, e.g., U.S. Pat. No. 9,734,526 ("System and method for providing a buy option through postings on a social network when user input is classified as having a sale intent"); U.S. Pat. No. 9,373,094 ("Dynamic web services system and method"); U.S. Pat. No. 9,305,066 ("System and method for remote data harmonization"); U.S. Pat. No. 9,300,745 ("Dynamic execution environment in network communications"); U.S. Pat. No. 9,275,121 ("Interoperable shared query based on heterogeneous data sources"); U.S. Pat. No. 9,224,163 ("Incremental computation of billing percentile values in a cloud based application acceleration as a service environment"); U.S. Pat. No. 9,203,874 ("Portal multi-device session context preservation"); U.S. Pat. No. 9,195,689 ("Converting structured data into database entries"); U.S. Pat. No. 9,152,627 ("Automatic rule generation"); U.S. Pat. No. 9,058,188 ("Transformative user interfaces"); U.S. Pat. No. 8,983,972 ("Collection and reporting of customer survey data"); U.S. Pat. No. 8,938,726 ("Integrating native application into web portal"); U.S. Pat. No. 8,924,269 ("Consistent set of interfaces derived from a business object model"); U.S. Pat. No. 8,898,442 ("Scenario-based process modeling for business processes including exception flow to handle an error in a task of the series of tasks"); U.S. Pat. No. 8,719,074 ("Editor and method for editing formulae for calculating the price of a service and a system for automatic costing of a service"); U.S. Pat. No. 8,621,549 ("Enforcing control policies in an information management system"); U.S. Pat. No. 8,413,045 ("Rich browser-based word processor"); U.S. Pat. Pub. No. 20150094046 ("Mobile device sharing facilitation methods and systems operable in network equipment"), and U.S. patent application Ser. No. 15/154,871 ("Facilitating offline or other contemporaneous editing of tabular data").

All of the patents and other publications referred to above are incorporated herein by reference generally—including those identified in relation to particular new applications of existing techniques—to the extent not inconsistent herewith. While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A system of operating one or more user interface (UI) governance servers 300C, the system comprising:

transistor-based circuitry configured to monitor data entry 1229A from a first client device 200A, at the one or more user interface governance servers 300C, to one or more enterprise resource planning (ERP) servers 300B;

transistor-based circuitry configured to obtain a first predicted value (content 419, e.g.) for a particular field 171 using one or more predictive data handling rules 875 of the first data handling protocol 860;

transistor-based circuitry configured to log a first instance of user input from a second client device 200B to the one or more ERP servers 300B superseding the first predicted value for the particular field using the first data handling protocol 860; and transistor-based circuitry configured to transmit a message 840 from the one or more user interface (UI) governance servers 300C via the second client device 200B that presents an automatically generated user-invokable option to deactivate one or more predictive data handling rules 875 (an "unlearn rule" control selectable by a user of the client device, e.g.) as an automatic and conditional response to one or more additional instances of user input from the second client device 200B to the one or more ERP servers 300B superseding the first predicted value, wherein the one or more additional instances of user input from the second client device 200B to the one or more ERP servers 300B superseding the first predicted value for the particular field using the first data handling protocol signals an exception count 801 exceeding an exception threshold 802 (explicitly or otherwise determined as a feature of the first data handling protocol 860, e.g.), and wherein the first predicted value is a result of the one or more predictive data handling rules 875 of the first data handling protocol 860.

2. The system of System Clause 1, wherein all of the transistor-based circuitry is implemented on a single application-specific integrated circuit (ASIC).

3. The system of System Clause 1, wherein the transistor-based circuitry is distributed across two or more mutually remote facilities.

4. The system of ANY of the above System Clauses, further comprising:

transistor-based circuitry configured to selectively transmit a validation-rule-compliant subset of the many records 122 (those which satisfy one or more validation protocols 863 in effect, e.g.) in a data table 110 to a data repository of an ERP application, wherein the data table resides in a browser and wherein the validation-rule-compliant subset of the many records 122 is established by an application of one or more validation protocols 863 of a data handling protocol 860 by which some fields 171 of the subset were populated.

5. A method of operating one or more user interface (UI) governance servers 300C, the method comprising:

invoking transistor-based circuitry configured to monitor data entry 1229A from a first client device 200A, at the one or more user interface (UI) governance servers 300C, to one or more ERP servers 300B;

invoking transistor-based circuitry configured to obtain a first predicted value (content 419, e.g.) for a particular field 171 using one or more predictive data handling rules 875 of the first data handling protocol 860;

invoking transistor-based circuitry configured to log a first instance of user input from a second client device 200B to the one or more ERP servers 300B superseding the first predicted value for the particular field using the first data handling protocol 860; and invoking transistor-based circuitry configured to transmit a message 840 from the one or more user interface (UI) governance servers 300C via the second client device 200B that presents an automatically generated user-invokable option to deactivate one or more predictive data handling rules 875 (an "unlearn rule" control selectable by a user of the client device, e.g.) as an automatic and conditional response to one or more additional instances of user input from the second client device 200B to the one or more ERP servers 300B superseding the first predicted value, wherein the one or more additional instances of user input from the second client device 200B to the one or more ERP servers 300B superseding the first predicted value for the particular field using the first data handling protocol signals an exception count 801 exceeding an exception threshold 802 (explicitly or otherwise determined as a feature of the first data handling protocol 860, e.g.), and wherein the first predicted value is a result of the one or more predictive data handling rules 875 of the first data handling protocol 860.

6. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

generating a first rule of the one or more predictive data handling rules 875 via machine learning; and transmitting a modified data entry protocol 1215 that includes a resequenced query set (wherein each query thereof is manifested as a field 171 in a form 852 or similar information element in a structured dialog 855, e.g.) to the first client device 200A as an automatic and conditional response partly based on receiving the rule acceptance 1242 (manifested as an acceptance code that identifies the first rule description 1241, e.g.) selectively corresponding to a first rule description 1241 from the second client device 200B and partly based on the first rule description 1241 having at least one element not present in the one or more first data entry protocols 1214B.

7. The method of ANY of the above method clauses, further comprising:

auto-generating the one or more predictive data handling rules 875 of a first data handling protocol 860 (via an aggregation of neural network nodes 340 spanning multiple servers 100, 300 or similar cloud-based machine learning apparatus, e.g.);

receiving registrations 1210 from (at least) first, second, and third client devices 200A-C; and transmitting the data handling protocol 865 to the client devices 200 in response to the registrations.

8. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

generating a first rule description 1241 (an improved data entry sequenced query set 850 or autocompletion protocol 861, e.g.) as a component of the message 840 from the one or more user interface (UI) governance servers 300C as the automatic and conditional response to the one or more additional instances of user input from the second client device 200B to the one or more ERP servers 300B superseding the first predicted value, wherein the first rule description signifies a proposed change to one or more data entry protocols 1214, wherein the message 840 contains the automatically generated user-invokable option (implemented as a hyperlink or similar user-invokable control, e.g.) to deactivate the one or more predictive data handling rules 875, and wherein the first data handling protocol 860 includes the one or more data entry protocols 1214.

9. The method of ANY of the above method clauses, further comprising:

receiving a registration 1210 from an additional client device 200 at the one or more UI governance servers 300C;

transmitting (a substantially similar version of) the message 840 to the additional client device 200 (from the one or more UI governance servers 300C, e.g.) as an automatic and conditional response to the registration 1210 from the additional client device 200, wherein the message 840 presents via the additional client device the automatically generated user-invokable option to deactivate the one or more predictive data handling rules 875 as the automatic and conditional response to the one or more additional instances of user input from the second client device 200 to the one or more ERP servers 300B superseding the first predicted value after the registration 1210 from the additional client device 200 is received and wherein the message 840 includes a first rule description 1241 (generated by cloud-based neural network nodes 340 or other machine learning circuitry, e.g.) that prospectively depicts an affect of deactivating the one or more predictive data handling rules 875; and transmitting the one or more first data entry protocols 1214 to the additional client device 200 (directly or via the one or more ERP servers 300B, e.g.) as an automatic and conditional response partly based on the registration 1210 and partly based on the one or more UI governance servers 300C having received a rule acceptance 1242 from the additional client device 200 corresponding to the first rule description 1241.

10. The method of ANY of the above method clauses, further comprising:

receiving training data 1205 at the one or more user interface (UI) governance servers 300C selectively in association with a data entry mode identifier (a user identifier or industry sector identifier, e.g.); and generating at least one of an autocompletion rule (a machine-generated instance of an event 871 automatically correlated with an autocompletion response 872, e.g.) of the autocompletion protocol 861 or an autocorrection rule (a machine-generated instance of an event 871 automatically correlated with an autocorrection response 872, e.g.) of the autocorrection protocol 862 by implementing machine learning at the one or more user interface (UI) governance servers 300C partly based on the training data 1205 corresponding to the data entry mode identifier and partly based on data entry 1229A from the first client device 200A to the one or more ERP servers 300B.

11. The method of ANY of the above method clauses, further comprising:

receiving a registration 1210A from the first client device 200A at the one or more UI governance servers 300C; and transmitting one or more data entry protocols 1214, including the first data handling protocol 860, to the first client device 200A (directly or via the one or more ERP servers 300B) as an automatic and conditional response to the registration 1210A from the first client device 200A at the one or more UI governance servers 300C.

12. The method of ANY of the above method clauses, further comprising:

obtaining a client classifier 1375 describing the second client device 200 during a device registration of the second client device; and transmitting the first data handling protocol 860 to the second client device 200 (from the one or more UI governance servers 300C, e.g.) that depends upon the client classifier 1375, wherein data entry 1229 from the second client device 200 to one or more ERP servers 300B is thereby initially performed (prior to refinements described herein, e.g.) using the initial data handling protocol 860.

13. The method of ANY of the above method clauses, further comprising:

auto-generating numerous predictive data handling rules 875 (i.e. more than 50) in association with a data entry mode identifier (a user identifier or data entry template identifier, e.g.) as a user selection provided via the first client device 200A; and allowing a human user to select a single one of the predictive data handling rules 875 from among the numerous predictive data handling rules 875 auto-generated as the one or more predictive data handling rules 875 of the first data handling protocol 860.

14. The method of ANY of the above method clauses, wherein the first data handling protocol is an autocompletion protocol 861 by virtue of including at least one autocompletion rule (as an instance of data handling rule 875, e.g.).

15. The method of ANY of the above method clauses, wherein the first data handling protocol is an autocorrection protocol 862 by virtue of including at least one autocorrection rule (as an instance of data handling rule 875, e.g.).

16. The method of ANY of the above method clauses, wherein the first data handling protocol is a data validation protocol 863 by virtue of including at least one data validation rule (as an instance of data handling rule 875, e.g.).

17. The method of ANY of the above method clauses, wherein the first data handling protocol is an autocompletion protocol and an autocorrection protocol.

18. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

obtaining an initial value of the exception threshold 802 as user input.

19. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

incrementing the exception threshold 802 as an automatic and conditional response to a time interval 804 longer than a week elapsing, wherein the time interval 804 is a function of a permissible exception rate 803 provided (by a system designer, e.g.) in association with the particular field as a component of the first data handling protocol 860. In a context in which a system designer specifies that a rate 803 of four exceptions per year are permissible, for example, a UI governance server 300C may in effect implement an exception threshold 802 that is incremented each time a time interval 804 of 13 weeks passes without a qualifying exception.

20. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

decrementing the exception threshold 802 as an automatic and conditional response to user input from another client device 200 to the one or more ERP servers 300B superseding the first predicted value for the particular field using the first data handling protocol 860. In a context in which a system designer specifies that a population-wide rate 803 of ten exceptions per month are permissible, for example, a UI governance server 300C may in effect implement an exception threshold 802 for the month that is decremented each time an exception is logged from some other user.

21. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

broadcasting the message 840 that presents the automatically generated user-invokable option to deactivate the one or more predictive data handling rules 875 as the automatic and conditional response to the one or more additional instances of user input from the second client device 200B to the one or more ERP servers 300B superseding the first predicted value to all client devices for which the one or more predictive data handling rules are active including the second client device 200B as an automatic and conditional response to a collective exception count exceeding a collective exception threshold.

22. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

broadcasting the message 840 that presents the automatically generated user-invokable option to deactivate the one or more predictive data handling rules 875 as the automatic and conditional response to the one or more additional instances of user input from the second client device 200B to the one or more ERP servers 300B superseding the first predicted value to all client devices for which the one or more predictive data handling rules are active including the second client device 200B as an automatic and conditional response to a collective exception count exceeding a collective exception threshold, wherein the exception count 801 is the collective exception count, and wherein the exception threshold 802 is the collective exception threshold.

23. The method of ANY of the above method clauses, wherein the one or more additional instances of user input from the second client device 200B to the one or more ERP servers 300B superseding the first predicted value for the particular field 171 using the data handling protocol 860 signals an exception count 801 exceeding an exception threshold 802 and wherein the data handling protocol 860 is both an autocompletion protocol 861 and an autocorrection protocol 862.

24. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

modifying the first data handling protocol by deactivating at least one rule (selected by a user of the second client device 200B, e.g.) of the one or more predictive data handling rules 875 as a conditional response to a user invoking the option to deactivate (unlearn, e.g.) the at least one rule.

25. The method of ANY of the above method clauses, wherein the invoking transistor-based circuitry configured to transmit the message 840 from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value comprises:

transmitting an email message (as message 840, e.g.) from the one or more user interface (UI) governance servers 300C via the second client device 200B that presents the automatically generated user-invokable option to deactivate the one or more predictive data handling rules 875 as the automatic and conditional response to the one or more additional instances of user input from the second client device 200B to the one or more ERP servers 300B superseding the first predicted value.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method of operating one or more user interface (UI) governance servers, the method comprising:

auto-generating one or more predictive data handling rules of a first data handling protocol;

invoking transistor-based circuitry configured to receive registrations from at least first, second, and third client devices;

invoking transistor-based circuitry configured to transmit the data handling protocol to the client devices in response to the registrations;

invoking transistor-based circuitry configured to monitor data entry from the first client device, at the one or more user interface governance servers, to one or more enterprise resource planning (ERP) servers;

invoking transistor-based circuitry configured to obtain a first predicted value for a particular field using one or more predictive data handling rules of the first data handling protocol;

invoking transistor-based circuitry configured to log a first instance of user input from the second client device to the one or more ERP servers superseding the first predicted value for the particular field using the first data handling protocol;

invoking transistor-based circuitry configured to transmit an email message from the one or more user interface governance servers via the second client device that presents an automatically generated user-invokable option to deactivate one or more predictive data handling rules as an automatic and conditional response to one or more additional instances of user input from the second client device to the one or more ERP servers superseding the first predicted value, wherein the one or more additional instances of user input from the second client device to the one or more ERP servers superseding the first predicted value for the particular field using the first data handling protocol signals an exception count exceeding an exception threshold, wherein the first data handling protocol comprises both an autocompletion protocol and an autocorrection protocol, and wherein the first predicted value is a result of the one or more predictive data handling rules of the first data handling protocol; and modifying the first data handling protocol by deactivating at least one rule of the one or more predictive data handling rules as a conditional response to a user invoking the option to deactivate the at least one rule.

2. The method of claim 1, wherein the first data handling protocol is also a data validation protocol by virtue of including at least one data validation rule.

3. A method of operating one or more user interface (UI) governance servers, the method comprising:

invoking transistor-based circuitry configured to monitor data entry from a first client device, at the one or more UI governance servers, to one or more enterprise resource planning (ERP) servers;

invoking transistor-based circuitry configured to obtain a first predicted value for a particular field using one or more predictive data handling rules of the first data handling protocol;

invoking transistor-based circuitry configured to log a first instance of user input from a second client device to the one or more ERP servers superseding the first predicted value for the particular field using the first data handling protocol; and invoking transistor-based circuitry configured to transmit a message from the one or more UI governance servers via the second client device that presents an automatically generated user-invokable option to deactivate one or more predictive data handling rules as an automatic and conditional response to one or more additional instances of user input from the second client device to the one or more ERP servers superseding the first predicted value, wherein the one or more additional instances of user input from the second client device to the one or more ERP servers superseding the first predicted value for the particular field using the first data handling protocol signals an exception count exceeding an exception threshold, and wherein the first predicted value is a result of the one or more predictive data handling rules of the first data handling protocol.

4. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:

generating a first rule of the one or more predictive data handling rules via machine learning; and transmitting a modified data entry protocol that includes a resequenced query set to the first client device as an automatic and conditional response partly based on receiving the rule acceptance selectively corresponding to a first rule description from the second client device and partly based on the first rule description having at least one element not present in the one or more first data entry protocols.

5. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:

generating a first rule description as a component of the message from the one or more UI governance servers as the automatic and conditional response to the one or more additional instances of user input from the second client device to the one or more ERP servers superseding the first predicted value, wherein the first rule description signifies a proposed change to one or more data entry protocols, wherein the message contains the automatically generated user-invokable option to deactivate the one or more predictive data handling rules, and wherein the first data handling protocol includes the one or more data entry protocols.

6. The method of claim 3, further comprising:

receiving a registration from an additional client device at the one or more UI governance servers;

transmitting the message to the additional client device as an automatic and conditional response to the registration from the additional client device, wherein the message presents via the additional client device the automatically generated user-invokable option to deactivate the one or more predictive data handling rules as the automatic and conditional response to the one or more additional instances of user input from the second client device to the one or more ERP servers superseding the first predicted value after the registration from the additional client device is received and wherein the message includes a first rule description that prospectively depicts an affect of deactivating the one or more predictive data handling rules; and transmitting the one or more first data entry protocols to the additional client device as an automatic and conditional response partly based on the registration and partly based on the one or more UI governance servers having received a rule acceptance from the additional client device corresponding to the first rule description.

7. The method of claim 3, further comprising:

receiving training data at the one or more UI governance servers in association with a data entry mode identifier; and generating at least one of an autocompletion rule of the autocompletion protocol or an autocorrection rule of the autocorrection protocol by implementing machine learning at the one or more UI governance servers partly based on the training data corresponding to the data entry mode identifier and partly based on data entryA from the first client device to the one or more ERP servers.

8. The method of claim 3, further comprising:

receiving a registration from the first client device at the one or more UI governance servers; and transmitting one or more data entry protocols, including the first data handling protocol, to the first client device as an automatic and conditional response to the registration from the first client device at the one or more UI governance servers.

9. The method of claim 3, further comprising:
obtaining a client classifier describing the second client device during a device registration of the second client device; and
transmitting the first data handling protocol to the second client device that depends upon the client classifier, wherein data entry from the second client device to one or more ERP servers is thereby initially performed using the initial data handling protocol.

10. The method of claim 3, further comprising:
auto-generating numerous predictive data handling rules in association with a data entry mode identifier as a user selection provided via the first client device; and
allowing a human user to select a single one of the predictive data handling rules from among the numerous predictive data handling rules auto-generated as the one or more predictive data handling rules of the first data handling protocol.

11. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:
obtaining an initial value of the exception threshold as user input.

12. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:
incrementing the exception threshold as an automatic and conditional response to a time interval longer than a week elapsing, wherein the time interval is a function of a permissible exception rate provided in association with the particular field as a component of the first data handling protocol.

13. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:
decrementing the exception threshold as an automatic and conditional response to user input from another client device to the one or more ERP servers superseding the first predicted value for the particular field using the first data handling protocol.

14. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:
broadcasting the message that presents the automatically generated user-invokable option to deactivate the one or more predictive data handling rules as the automatic and conditional response to the one or more additional instances of user input from the second client device to the one or more ERP servers superseding the first predicted value to all client devices for which the one or more predictive data handling rules are active including the second client device as an automatic and conditional response to a collective exception count exceeding a collective exception threshold.

15. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:
broadcasting the message that presents the automatically generated user-invokable option to deactivate the one or more predictive data handling rules as the automatic and conditional response to the one or more additional instances of user input from the second client device to the one or more ERP servers superseding the first predicted value to all client devices for which the one or more predictive data handling rules are active including the second client device as an automatic and conditional response to a collective exception count exceeding a collective exception threshold, wherein the exception count is the collective exception count, and wherein the exception threshold is the collective exception threshold.

16. The method of claim 3, wherein the one or more additional instances of user input from the second client device to the one or more ERP servers superseding the first predicted value for the particular field using the data handling protocol signals an exception count exceeding an exception threshold and wherein the data handling protocol is both an autocompletion protocol and an autocorrection protocol.

17. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:
modifying the first data handling protocol by deactivating at least one rule of the one or more predictive data handling rules as a conditional response to a user invoking the option to deactivate the at least one rule.

18. The method of claim 3, wherein the invoking transistor-based circuitry configured to transmit the message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value comprises:

transmitting an email message from the one or more UI governance servers via the second client device that presents the automatically generated user-invokable option to deactivate the one or more predictive data handling rules as the automatic and conditional response to the one or more additional instances of user input from the second client device to the one or more ERP servers superseding the first predicted value.

19. A system for operating one or more user interface (UI) governance servers, the system comprising:
  one or more processors comprising
  transistor-based circuitry configured to monitor data entry from a first client device, at the one or more UI governance servers, to one or more enterprise resource planning (ERP) servers;
  transistor-based circuitry configured to obtain a first predicted value for a particular field using one or more predictive data handling rules of the first data handling protocol;
  transistor-based circuitry configured to log a first instance of user input from a second client device to the one or more ERP servers superseding the first predicted value for the particular field using the first data handling protocol; and
  transistor-based circuitry configured to transmit a message from the one or more UI governance servers via the second client device that presents an automatically generated user-invokable option to deactivate one or more predictive data handling rules as an automatic and conditional response to one or more additional instances of user input from the second client device to the one or more ERP servers superseding the first predicted value, wherein the one or more additional instances of user input from the second client device to the one or more ERP servers superseding the first predicted value for the particular field using the first data handling protocol signals an exception count exceeding an exception threshold, and wherein the first predicted value is a result of the one or more predictive data handling rules of the first data handling protocol.

* * * * *